Aug. 26, 1952     K. MINAMI     2,608,047
BAMBOO RAKE
Filed Feb. 21, 1950

INVENTOR.
K. MINAMI
BY
ATTORNEY

Patented Aug. 26, 1952

2,608,047

UNITED STATES PATENT OFFICE 2,608,047

BAMBOO RAKE

Kay Minami, Seattle, Wash.

Application February 21, 1950, Serial No. 145,521

1 Claim. (Cl. 56—400.17)

This invention relates to the art of lawn rakes, and particularly lawn rakes the teeth of which are made of the genus of arborescent grass known as bamboo.

The object of the present invention is to devise a perfected lawn rake whose teeth comprise strips cut from bamboo stalks and characterized in that the same are so cut as to inherently give a maximum of strength and wear life to the prongs formed at the free end of the teeth.

With the foregoing and other still more particular objects and advantages in view, the invention consists in the novel construction and in the adaptation and combination of parts hereinafter described and claimed.

Figure 1:
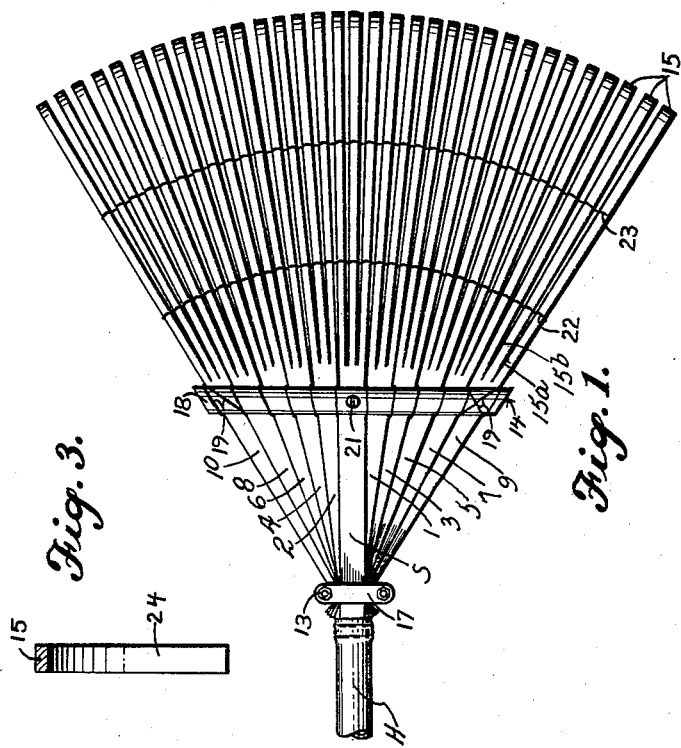
Figure 1 is a fragmentary bottom plan view portraying a bamboo rake made in accordance with the preferred teachings of the present invention.
Figure 3:
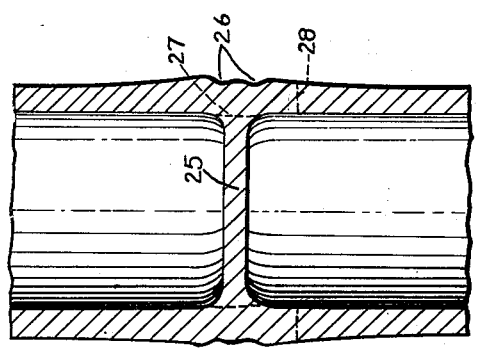
Fig. 3 is a transverse vertical sectional view of a single tooth of the rake taken to an enlarged scale on line 3—3 of Fig. 2.
Figure 2:
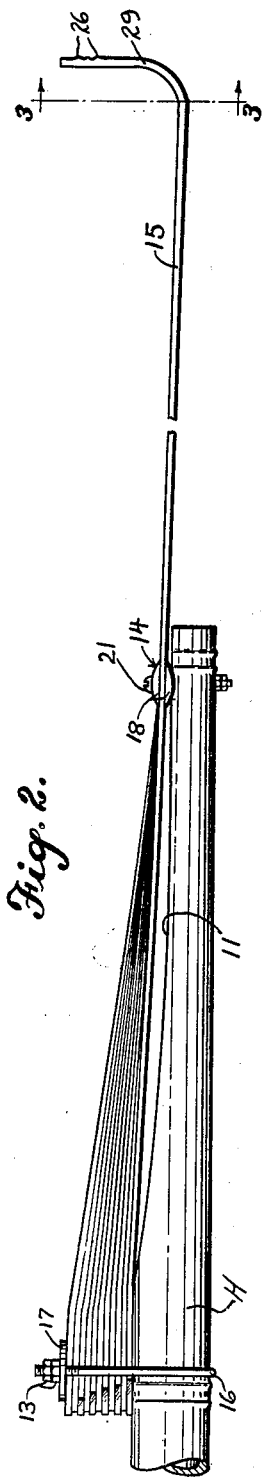
Fig. 2 is a side elevational view thereof taken to an enlarged scale, and only showing one of the fingers and its related tooth.

Referring to the drawings, the reference character H designates a rake handle consisting of a length of bamboo stalk, and secured to the forward end of this handle, in a manner hereinafter described, are a plurality of bamboo finger strips so arranged as to fan outwardly from their root ends, the latter being piled in juxtaposition. An uneven number of these strips is provided, the one occupying the central position in the fan-like collocations being lettered S and being superior in point of position within the stack. Progressing downwardly from this central strip S the odd-numbered root ends 1, 3, 5, 7, and 9 in the stalk correspond to the finger strips on one side of such central strip S while the even numbered root ends 2, 4, 6, 8, and 10 correspond to the strips on the other side thereof. The root ends are yoked together and to the handle H. The yoking connection comprises a U-shaped shackle-bolt 16 whose legs are customarily threaded at their free ends and are joined by a cross-arm 17 having two spaced holes for receiving the legs. The shackle-bolt is passed around the handle 10 with its legs on both sides of and extending above the juxtaposed root ends of the finger strips, while the cross-arm 17 is superposed upon the strips. Nuts 13 are applied on the threaded free ends of the shackle-bolt and drawn up to tightly cinch the root ends of the strips and the handle.

As the strips 12 fan out forwardly of the shackle-bolt they reach a point at which they cease to overlap and at approximately this point a clamp 14 is applied. This clamp comprises two bamboo bars 18 each having a flat face and it is between these faces that the finger strips 12 are caught. Wires 19 are wound around the bars 18 between the strips 12 and serve with a stabilizing bolt to establish the clamping pressure, as well as tying the strips against liability of lateral displacement. It will be noted that the forward end of the handle is preferably whittled down on its upper face to form a flat seat 11 for the lower clamp bar.

Each finger strip has two longitudinal slits $15^a$ and $15^b$ therein which trisect the forward end of the strip into three fingers 15. These fingers are uniformly spread apart by the use of spaced wires 22 and 23 which are woven over and under adjacent fingers and are returned in opposite sequence. It will be noted that these wires not only keep the fingers apart a predetermined distance but also prevent the fingers from being forced apart in such greater degree as might cause the slits of the finger strips to progress along the length of the fingers and, perhaps the more important, assure that all of the fingers will act in concert and thus prevent an excessive bending of an individual finger when pressure is applied to the rake handle.

The free ends of the fingers 15 are bent at substantially right angles to the finger axes to form teeth or prongs 24 for catching and holding the grass, leaves or other refuse being raked. The bending operation is accomplished by concentrating heat at the desired bending point and then manually bending the tip, which bend will be permanently retained when the heated portion of the finger cools.

Figure 4:
Fig. 4 is a vertical sectional view portraying a portion of a bamboo stalk and showing by dotted lines the manner in which the strips which compose the raking teeth are cut from the stalk.

A bamboo stalk has what are commonly termed joints at regularly spaced intervals of its length and one such joint is shown in Fig. 4. Such a stalk is substantially hollow and each joint is particularized by an increase in the outside diameter of the stalk, resulting in a thickening of the stalk wall, and the occurrence of a web 25 bridging the inside walls of the stalk at the center of the joint. The outside face of the joint is characterized, not only by the diameter increase, but also by a pair of circumscribing grooves 26. It is important to note that the material at the joint is particularly tough and strong.

I include the joint structure of the bamboo stalk by sawing through the bamboo stalk from which the finger strips 12 are to be cut so as to include a joint. Such a saw cut is shown by the dotted lines 28 in Fig. 4, it being assumed in this figure that the portion of the stalk above such cut is to be used for the strips. After this sawing operation the web 25 is severed from the walls of the joint as shown by the dotted lines 27, a boring tool being desirably used for the purpose, and the stalk is cut longitudinally to provide a plurality of finger strips. The joint end of each of these strips is then trisected longitudinally to form the fingers 15 which are then bent rearwardly of the joint portion as at 29 so that each resulting tooth 24 is substantially composed of the joint structure. As a result the teeth of my rake are much thicker than the fingers proper. This thickness increase, combined with the inherent greater toughness of the joint material, provides rake teeth which are much stronger and wear-resistant than any bamboo teeth before attained in the art.

The invention should, it is believed, be clearly understood from the foregoing detailed description, and it is my intention that the hereto annexed claim be read with the broadest interpretation to which the employed language fairly admits.

What I claim is:

A bamboo rake comprising a handle, and a plurality of longitudinal sections of bamboo stalk forming fingers arranged in a fan-like collocation and secured to the handle, the outer ends of the strips having bends to form teeth, each such tooth including adjacent its end a joint portion of the bamboo stalk.

KAY MINAMI.

REFERENCES CITED

The following references are of record in the file of this patent:

UNITED STATES PATENTS

| Number | Name | Date |
|---|---|---|
| 1,499,086 | Tsuchiya | June 24, 1924 |
| 1,611,488 | Rocquin et al. | Dec. 21, 1926 |
| 1,688,569 | Wensel | Oct. 23, 1928 |
| 1,752,447 | Maus | Apr. 1, 1930 |
| 1,989,815 | McGuire | Feb. 5, 1935 |
| 2,018,311 | McGuire | Oct. 22, 1935 |
| 2,040,205 | Kaufman | May 12, 1936 |
| 2,122,359 | Sage | June 28, 1938 |
| 2,210,784 | Tokunaga | Aug. 6, 1940 |
| 2,364,849 | Ibbotson et al. | Dec. 12, 1944 |